March 26, 1935.   J. BRUNTON ET AL   1,995,534

EXPANDING BRAKE AND THE LIKE

Filed Oct. 23, 1933

INVENTORS
JOHN BRUNTON
THOMAS GRAHAM
BY Fetherstonhaugh & Co
ATTORNEYS

Patented Mar. 26, 1935

1,995,534

UNITED STATES PATENT OFFICE 1,995,534

EXPANDING BRAKE AND THE LIKE

John Brunton, Campbell River, British Columbia, and Thomas Graham, Comox, British Columbia, Canada Application October 23, 1933, Serial No. 694,744

4 Claims. (Cl. 188—78)

Our invention relates to improvements in expanding brakes and the like which are particularly adapted for use on motor vehicles.

The objects of the invention are to provide means operable through pull rods, cables or hydraulic means whereby the brake band is maintained at all times concentric to the drum, so that every portion of the brake lining will be subjected to equal wear, thus reducing the effort required to apply the brake and reducing the need for adjustment to the minimum.

The invention consists of a drum in which an expanding band is non-rotatably carried and a conical structure is provided within the band which is adapted for endwise movement, said cone being adapted to expand the band into braking contact with the drum, as will be more fully described in the following specification and shown in the accompanying drawing, in which:—

In the drawing like characters of reference indicate corresponding parts in each figure.

Figures 1, 2:
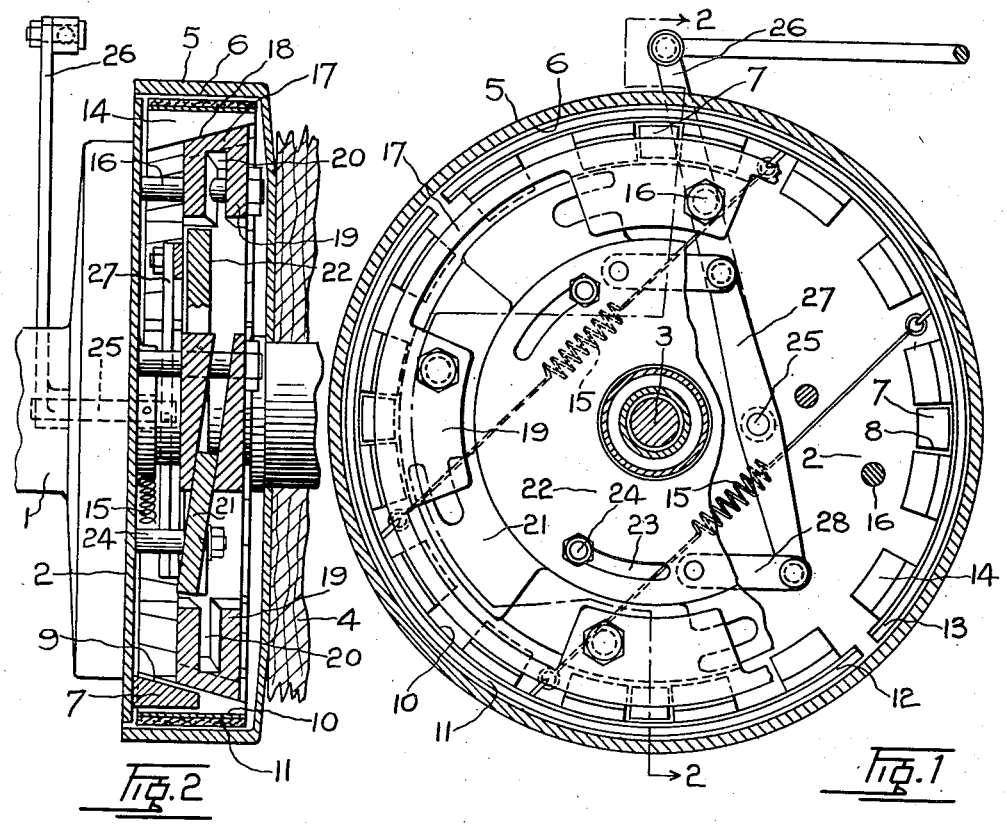
Fig. 1 is a sectional elevation of the brake taken from the inside of the drum looking from the wheel side.
Fig. 2 is a sectional view taken on the line 2—2 of Figure 1.

The numeral 1 indicates an axle housing of a motor vehicle fitted at its outer end with a plate 2. Extending through the housing 1 is an axle 3 to which the wheel 4 is secured. The wheel 4 is fitted with a brake drum 5 having an inner peripheral rim 6.

A plurality of anchor blocks 7 are secured adjacent the periphery of the plate 2, which blocks are provided with sides radial to the plate as at 8, see Figure 1, and with an inclined inner face 9 coinciding with but spaced from the cone to be hereinafter described. Loosely carried upon the plate 2 is a brake band 10 having the usual liner material secured to its outer face as at 11, this band is preferably divided into two semi-circular portions 12 and 13. Secured upon the inner periphery of the brake band 10 is a plurality of tapered blocks 14, two of which are disposed in close proximity to and on opposite sides of the anchor blocks 7, so as to prevent rotation of the band and to permit it to expand and contract as required. The tapered surface of the blocks form in effect a conical inner periphery to the brake band. A pair of springs 15 are connected at opposite ends to opposing sides of the brake band to contract it and withdraw it from braking engagement with the brake drum 5. A plurality of studs 16 extend from the plate 2 which serve as guides for a cone generally indicated by the numeral 17.

The cone 17 has a peripheral face 18 coinciding with the taper of the blocks 14, so that as the cone is moved towards the plate 2 the blocks 14 are forced radially outward, thus expanding the brake band 10. The cone 17 is provided with internal lugs 19 each having a helical thread groove 20 which is engaged by corresponding lugs 21 extending from a disc 22 which is rotatable about the outer end of the axle housing 1. The disc 22 is provided with arcuate slots 23 and is carried upon shouldered studs 24, which hold said disc against movement endwise of the axle.

Journalled in the plate 2 is a shaft 25 having at one end an operating lever 26 adapted for connection by cable or other means, not shown, to a brake lever or pedal and fitted at its inner end with a rocking arm 27 which is connected at each end by links 28 to the disc 22.

Figures 3, 4:
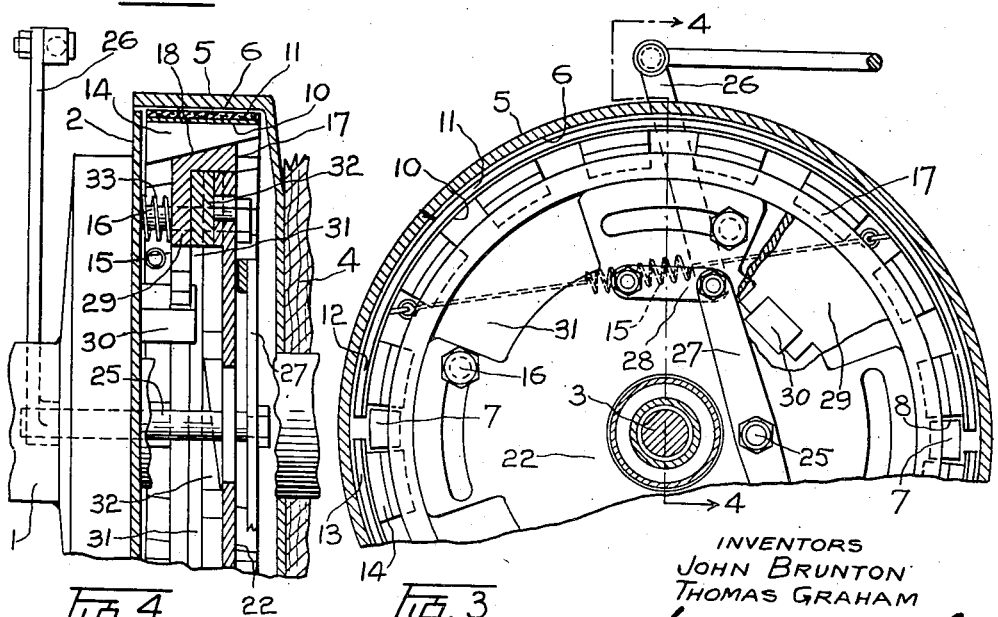
Fig. 3 is a sectional part elevation of a modification.
Fig. 4 is a sectional view taken on the line 4—4 of Figure 3.

In the modification shown in Figures 3 and 4 a slightly cheaper construction is provided, the cone 17 is provided with internally projecting lugs 29 which slidably engage stops 30 mounted upon the plate 2. The cone is fitted with a ring 31 having wedge faced sections 32. The cone is moved into engagement by the lugs 21 of the disc 22, such lugs coacting with the wedge faced sections 32. The cone 17 is slidably movable upon the studs 16 and is forced outwards by springs 33 upon said studs.

In operation as the lever 26 is drawn in a clockwise direction, see Figures 1 and 3, the rocking arm 27 moves in a similar direction imparting a turning movement to the disc 22, the lugs 21 of which through engagement with the helical thread grooves 20 of the cone force the cone towards the plate 2, the cone face 18 engages the tapered blocks 14 to spread them apart and expand the brake band 10 into braking engagement with the drum. The reversal of the brake lever through the lugs 21 and the grooves 20 reverses the cone movement, thus releasing the braking engagement between the cone 17 and the brake band 10.

What we claim as our invention:

1. A brake comprising a plate and a drum, a contractile brake band non-rotatably carried by the plate and adapted for expansion into gripping contact with the drum, said brake band having a conical interior periphery formed by a plurality of closely spaced tapered blocks secured to the interior of the brake band, a cone normally engaging said conical periphery, and means for imparting endwise movement to the cone to expand the brake band.

2. A brake comprising a plate and a drum, a contractile brake band mounted upon the plate, anchor blocks upon the plate adapted to prevent rotational movement to the band, said band having a substantially conical interior periphery formed by a plurality of closely spaced tapered blocks secured to the interior of the brake band, a cone adapted for endwise movement towards and away from the plate, and screw means for forcing the cone into the conical interior of the brake band to expand it into contact with the drum.

3. A brake comprising a plate and a drum, a contractile band non-rotatably mounted upon the plate a plurality of closely spaced tapered blocks secured to the inner face of the band, a cone slidable along the axis of the drum into the band to engage the tapered blocks to expand said band, said cone being non-rotatably carried by the plate, a disc rotatable within the cone, and means complementary to said disc and cone for imparting endwise movement to the cone from rotation movement of the disc, and means for rotating the disc.

4. A brake comprising a plate and a drum, a contractile band non-rotatably mounted upon the plate a plurality of closely spaced tapered blocks secured to the inner face of the band, a cone slidable along the axis of the drum into contact with the inner face of the tapered blocks to expand the band, said cone being non-rotatably carried by the plate, a disc rotatable within the cone, means for imparting rotative movement to the cone, and means complementary to the cone and disc whereby rotation of the disc in one direction forces the cone into the brake band to expand it and whereby rotation of the disc in the opposite direction withdraws the cone and permits the band to contract.

JOHN BRUNTON.
THOMAS GRAHAM.